US008288890B2

(12) United States Patent
Young

(10) Patent No.: US 8,288,890 B2
(45) Date of Patent: Oct. 16, 2012

(54) SIMPLE EMERGENCY POWER CONNECTION SWITCH

(76) Inventor: Gordon W. Young, Salt Lake City, UT (US)

( * ) Notice: Subject to any disclaimer, the term of this patent is extended or adjusted under 35 U.S.C. 154(b) by 299 days.

(21) Appl. No.: 12/652,025

(22) Filed: Jan. 4, 2010

(65) Prior Publication Data

US 2010/0181177 A1 Jul. 22, 2010

Related U.S. Application Data

(60) Provisional application No. 61/204,176, filed on Jan. 2, 2009.

(51) Int. Cl.
*H02J 7/00* (2006.01)
*H02J 9/00* (2006.01)

(52) U.S. Cl. ................ 307/64; 307/42; 307/65; 307/70; 307/125

(58) Field of Classification Search .................... 307/64, 307/65, 70, 43, 125; 361/118
See application file for complete search history.

(56) References Cited

U.S. PATENT DOCUMENTS 2,071,713 A * 2/1937 Terrill, Jr. .................... 439/714
7,611,366 B2 * 11/2009 Davis .......................... 439/188
7,651,390 B1 * 1/2010 Profeta et al. ................ 454/307
2004/0036362 A1 * 2/2004 Beck et al. .................. 307/125

* cited by examiner

*Primary Examiner* — Rexford Barnie
*Assistant Examiner* — Toan Vu
(74) *Attorney, Agent, or Firm* — Paul C. Oestreich; Eminent IP, P.C.

(57) ABSTRACT

This invention creates a simple, low cost mechanical transfer switch (called Gen/Safe) which provides users the ability to connect nearly any portable household generator to supply whole house power (to the limit of the particular generator) in the event of an emergency outage. Installed by the utility in less than five minutes, the switch provides visual confirmation of utility isolation while still allowing user supplied power not only from emergency sources, but also allows PV, wind, and other on-site power to operate normally to supply the home directly without interruption when possible. This connection is also suitable as an ongoing utility connection for user generated alternate energy power systems while providing an additional utility safety isolation factor for alternate power sources which must shut down when utility power fails; (to protect repair personnel).

10 Claims, 6 Drawing Sheets

SIMPLE EMERGENCY POWER CONNECTION SWITCH

CROSS-REFERENCE TO RELATED APPLICATIONS

This non-provisional patent application claims priority from U.S. provisional patent application No. 61/204,176 filed Jan. 2, 2009.

STATEMENT REGARDING FEDERALLY SPONSORED RESEARCH OR DEVELOPMENT

Not applicable.

BACKGROUND OF THE INVENTION

1. Field of the Invention

The present invention relates to electrical switching assemblies. In particular, the present invention relates to transfer switch assemblies for interconnecting emergency power and retaining alternate energy power to a building when utility power has failed.

2. Description of Related Art

Long term power outages often occur during storms, earthquakes and many other types of conditions. Because we are all so dependent on electric power, it is desirable to provide emergency power sources for individual utility customers to provide furnace, lighting and refrigeration operation among many other needs during these outages. Often in the case of ice storms, earthquakes and other difficulties it will be many days before power is fully restored. Backup power is exceedingly desirable, but homeowners and other small users are limited either to buying a generator and powering necessary loads with multiple extension cords or having complex transfer switches installed by professional installers at high cost along with permanently mounted outside generators and automatic transfer switch capabilities. In an effort to make generator connection easier and perhaps less costly, several inventors have suggested switch housings which fit between the utility meter base and the utility meter to allow easier connections to be made, and switching functions to be accomplished between external generators and the user load. Most of these units either contain costly switching relays operated automatically, or require an external control box mounted somewhere near the meter and connected by conduit as part of a permanent installation to function properly. These units are also difficult and costly to install and may be subject to failure. The following U.S. Pat. Nos. are representative of the art: U.S. Pat. No. 6,074,246 to Seefedt et al., U.S. Pat. No. 6,200,158 to Robinson, U.S. Pat. No. 6,663,422 to Robinson and U.S. Pat. No. 7,040,920 to Johnson, Jr. et al.

A SHORT DESCRIPTION OF THE DRAWINGS

Drawings in this application explain the many unique features of this approach.

FIG. 1*a* is a drawing of a typical costly, permanently installed generator with an inside manual transfer switch as an example of current technology.

FIG. 1*b* is a drawing of a typical current meter base adapter installation with a generator.

Figure 4A:
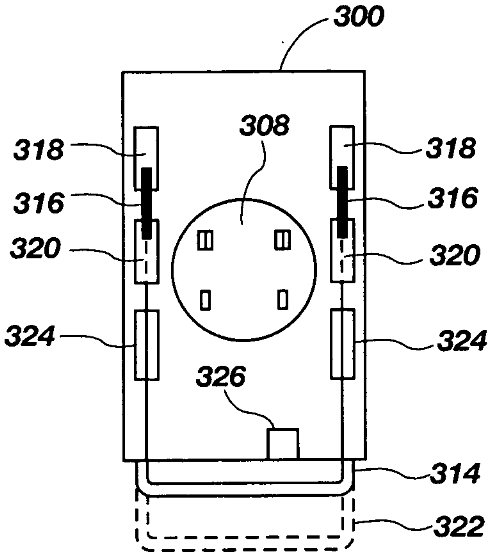
Figure 4B:
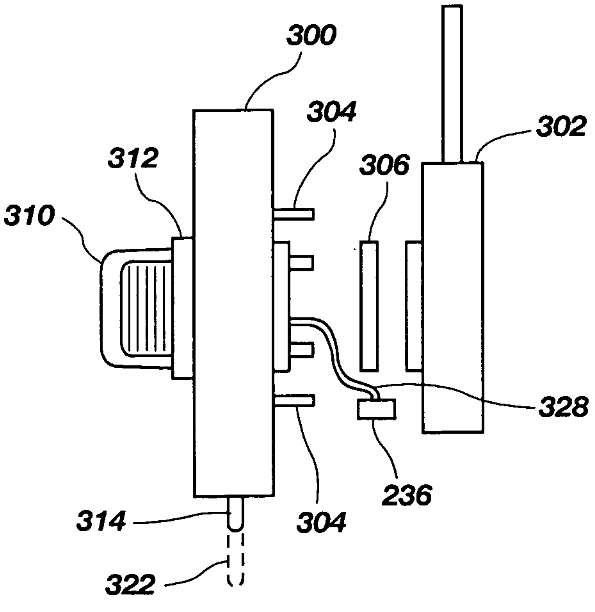

FIGS. 4*a* and 4*b* show front and side views of a second embodiment of the device designed for higher power generators and different mounting needs.

Figure 2:
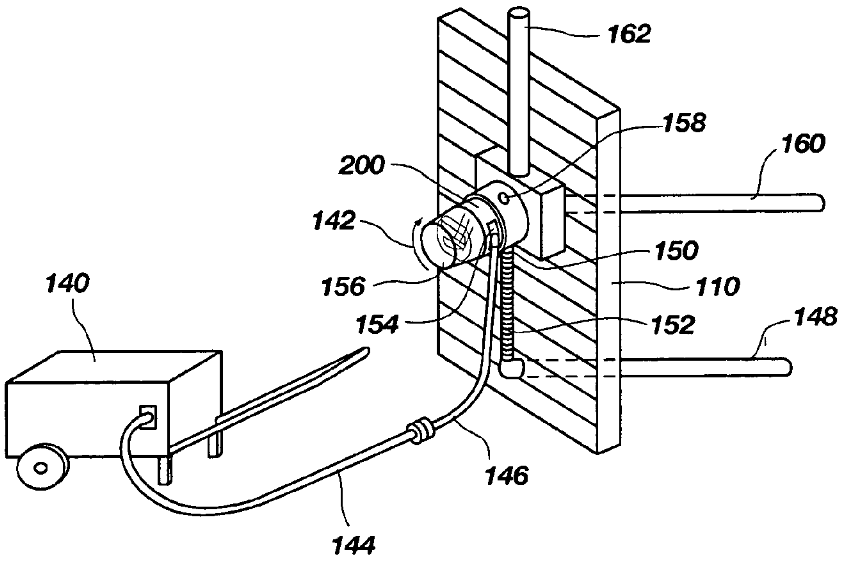
FIG. 2 is a drawing of a simple installation of an embodiment of the low cost switch (Gen/Safe) according to the present invention.
Figure 5A:
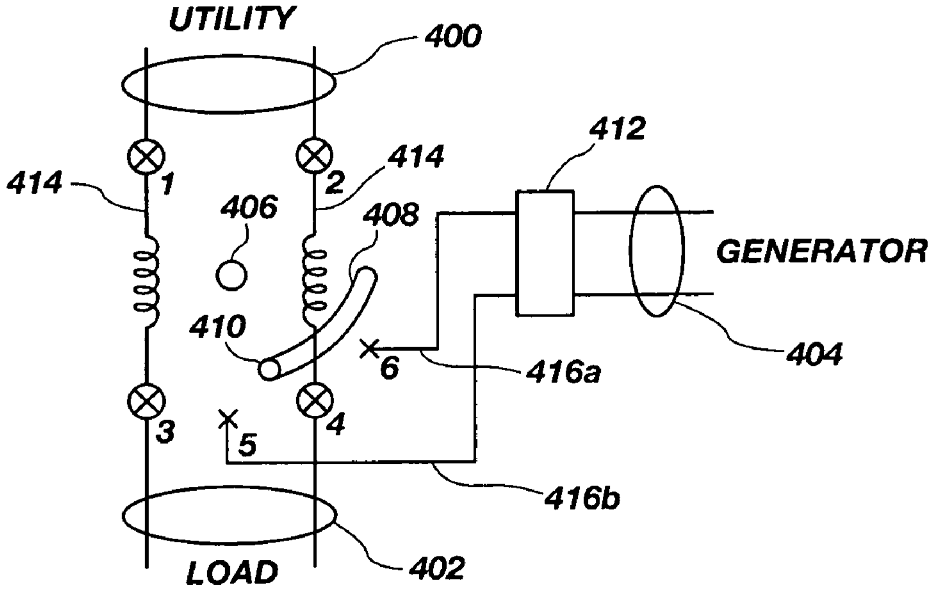

FIG. 5*a* shows an example of the switching mechanism used in the round unit of FIG. 2 in normal or utility position.

Figure 5B:
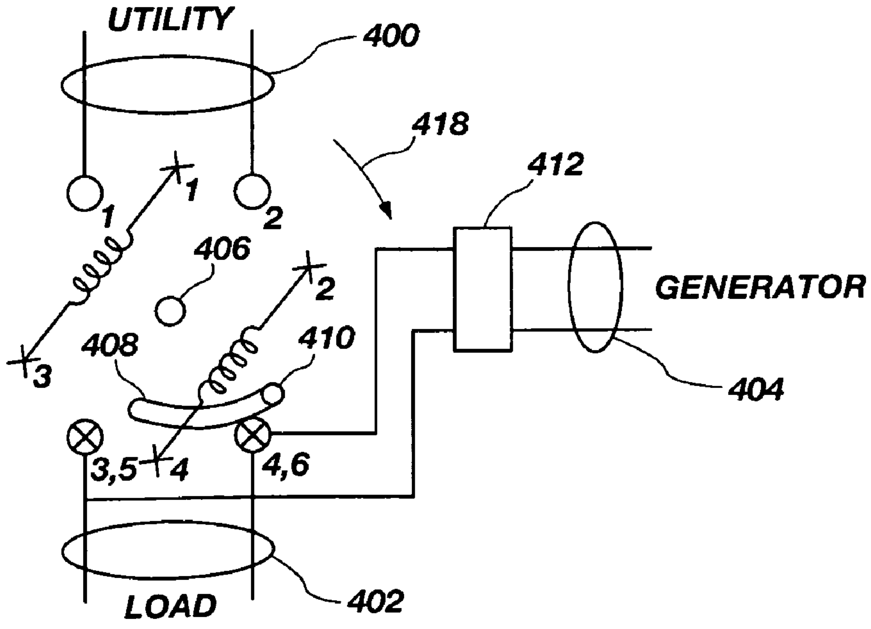

FIG. 5*b* shows an example of the switching mechanism used in the round unit of FIG. 2 in generator position after rotation.

Figure 6A:
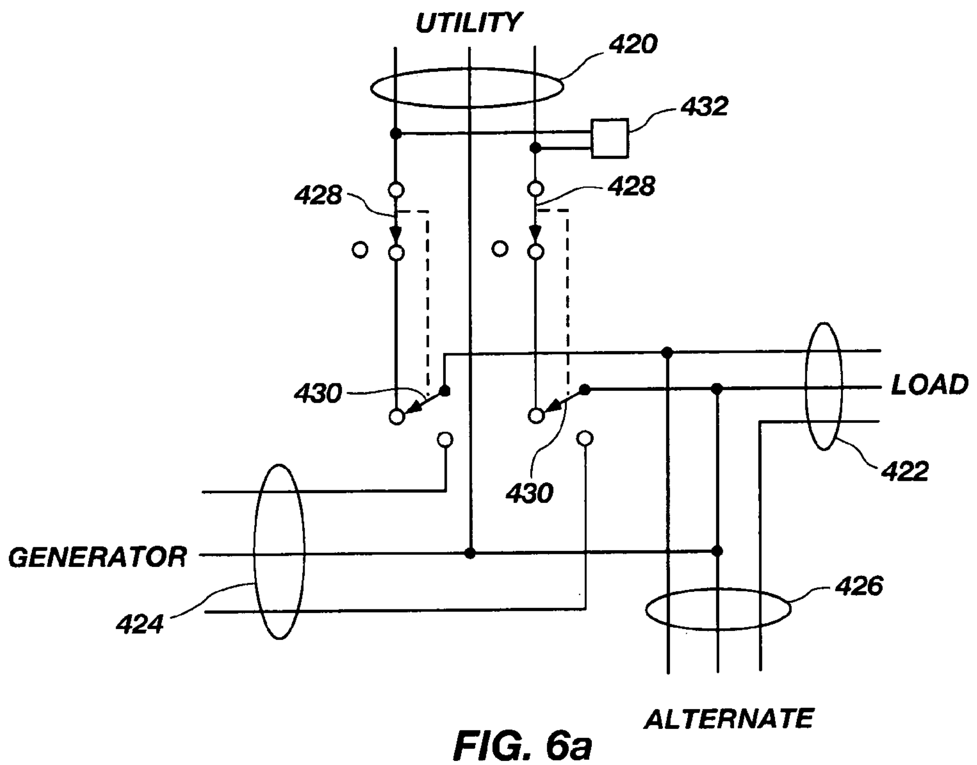

FIG. 6*a* shows a schematic of the electrical connections used in the round unit of FIG. 2.

Figure 6B:
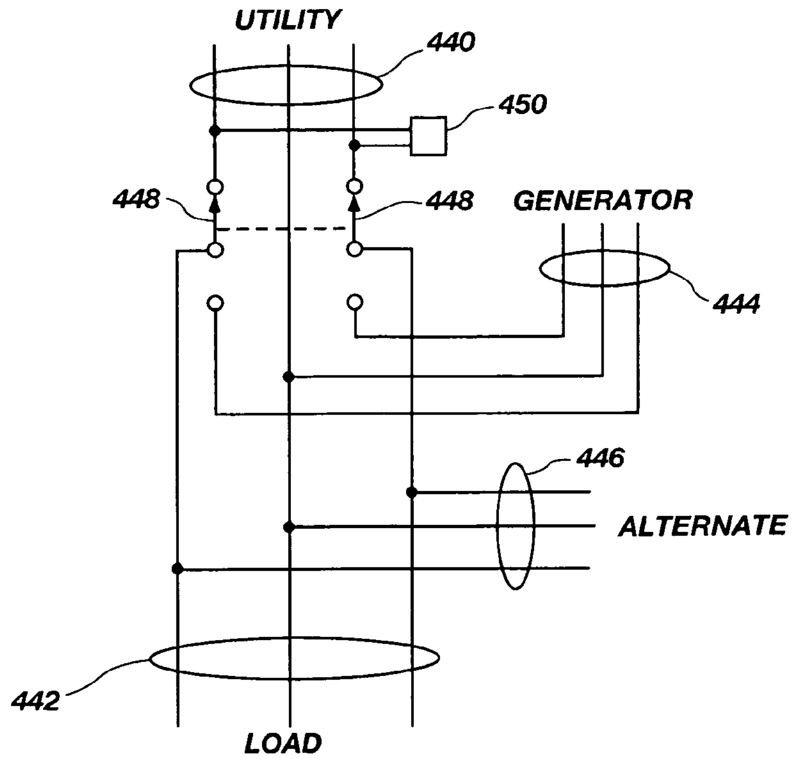

FIG. 6*b* shows a schematic of the electrical connections used in the high current unit.

Figure 7A:
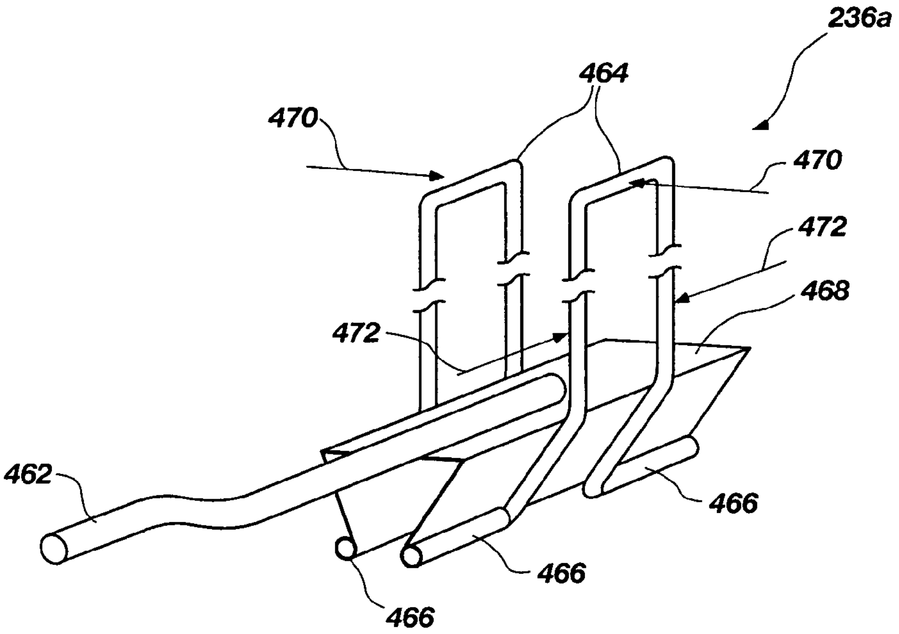
Figure 7B:
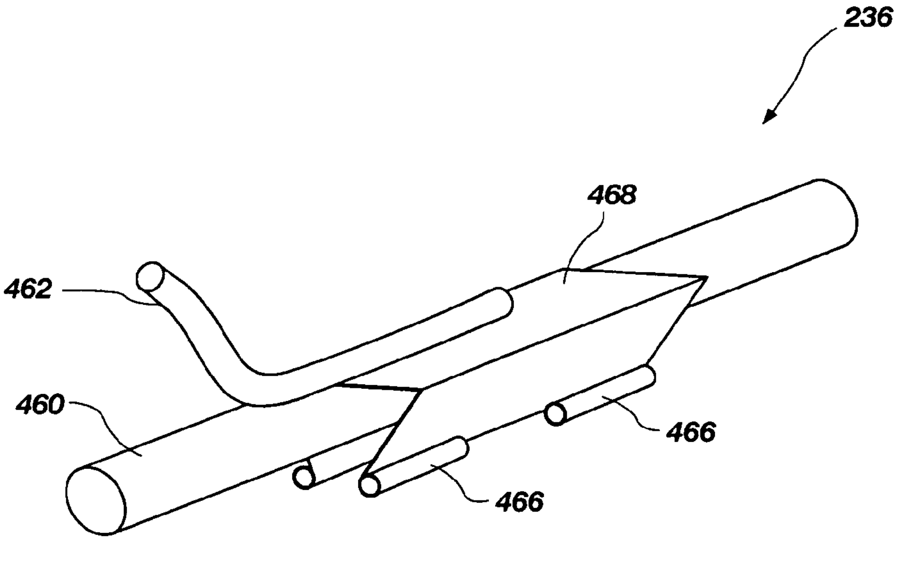

FIGS. 7*a* and 7*b* shows the design of the rapid connection clip for connection to the user's neutral wire to save installation time. More particularly, FIG. 7*a* shows the rapid connection clip with disposable insulated wire levers and FIG. 7*b* shows the rapid connection clip without the disposable insulated wire levers and attached to the user's neutral wire.

DISCLOSURE OF PREFERRED EMBODIMENTS OF THE INVENTION

The intent of the current invention is to supply a very low cost switching device (also referred to herein as a "utility meter connection means" or the "Gen/Safe unit") which is designed primarily for extended emergency use with low cost plug-in generators. This unit has unique safety features both for the user and the utility and is designed to be manually operated (by rotating the meter or moving a special handle) while providing visual indication of utility isolation. The unit can also be used as a standardized connection point for alternate energy systems which transmit excess energy back into the utility lines. It is designed to be used in significant emergency situations where the inability to automatically switch between utility and emergency power is not a problem and the ability to install this switch in less than five minutes keeps installation costs low as well.

By keeping all costs low, it is hoped that a large number of the 23 million residential power connections in the U.S. may take advantage of Gen/Safe and the opportunity to provide both 120 and 240 volt AC power (if available from the generator) during a short or extended power outage. The inventor believes the need to operate a single switch manually in a very low cost unit will be well offset by the low cost opportunity to live a mostly normal life during extended power outages even if only a modest system is affordable. Gen/Safe can also be used in multiple meter banks such as those existing in apartments where there is little space between mounted power meters.

Although the two embodiments shown are preferred, other embodiments are also contemplated which would be included in the material in this application.

Figure 1A:
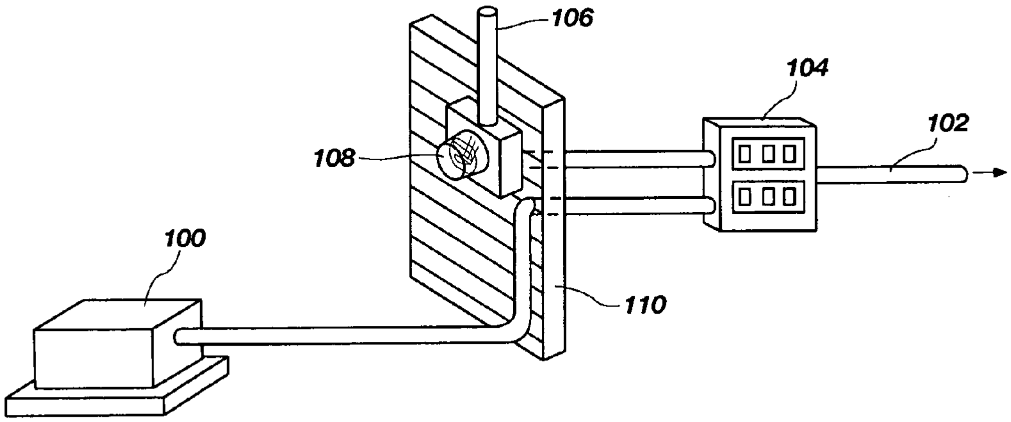
FIG. 1a (PRIOR ART)

FIG. 1*a* shows a typical permanent generator 100 connection to a customer load 102 through a manual load transfer switch/customer fuse box 104 capable of transferring individual loads at the customer fuse box 104 to an external generator 100 on external wall 110. The manual load transfer switch 104 requires extensive professional work to connect, and testing on completion is required to insure no alternate power from the generator 100 can activate external utility lines 106 through the meter 108 and utility input lines 106.

Figure 1B:
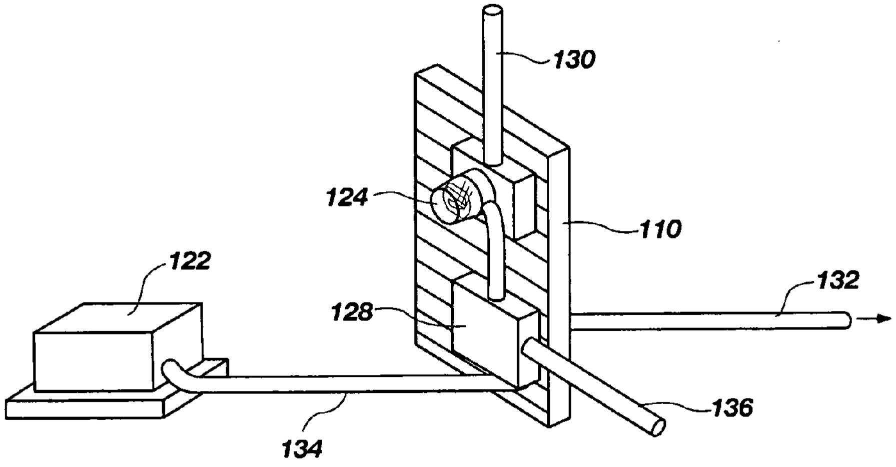
FIG. 1b (PRIOR ART)

FIG. 1*b* shows a typical permanent generator 122 connection to a customer utility load 132 using a meter plug in connection 124 on wall 110. The generator 122 is connected to an automatic on-off relay 128 known as a "transfer switch relay". On-off relay 128 consists basically of a double-pole double-throw set of contacts which in one position connect both incoming lines 130 from the utility 120/240 volt source to the customer load 132. In the unenergized state, the load 132 is connected to a second set of contacts (not shown in FIG. 1*b*) which are normally connected to the alternate generator supply lines 134. On-off relay 128 is also a controller which is often used to start the generator 122 and re-connect the load 126 to utility lines 130 when power is restored. If the controller 128 also has a connection for a premise-based alternate energy power source 136 such as that provided by a solar or wind generator 136, such an alternate energy power source connection 136 is required to disconnect using a system (not shown) which is part of the alternate energy power source system (not shown) when utility power fails, so as not to energize utility lines 130 during power outages for safety considerations during repair. The automatic shut down of the alternate energy system connected at lines 136 may be disabled in some cases, if the transfer switch relay 128 provides isolation. But, there are several regulatory and safety issues involved and utility power company personnel also have issues with this sort of system.

Figure 3:
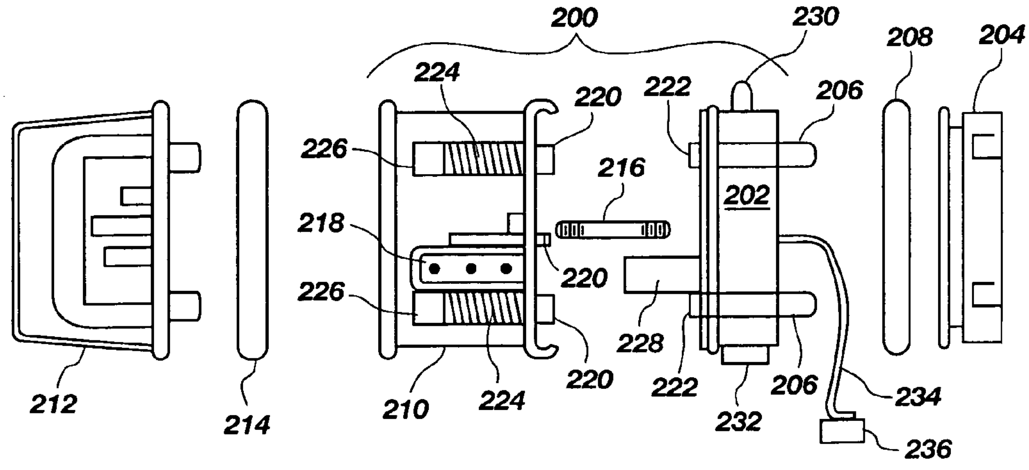
FIG. 3 shows an exploded view of the Gen/Safe round unit shown in FIG. 2 with construction features.

FIG. 2 is a drawing of the simple installation of the Gen/Safe unit 200 outlined in this application. In this installation, the portable generator 140 is connected to the meter connection plug 154 in the Gen/Safe unit 200 on wall 110 by an extension cord 144 which is only installed when utility power 162 fails and which requires a short additional adapter cord 146 in series with the extension cord 144 to adapt any standard generator cord to the specialized Gen/Safe unit connector 150 outlined in FIG. 3 (described in further detail below). An optional connection conduit 148 from an alternate energy power source to the non-rotating part 202 of the Gen/Safe unit 200 is also shown in FIG. 3. The connector 150 for this alternate energy power source may be plugged in or disconnected at any time because of flexible armored cable 152 allowing sufficient movement. Gen/Safe unit 200 is designed to offer manual disconnect only.

In order to operate a disconnect from utility power lines 162 to supply generator power 140 and provide access to the generator plug-in connector 150, the utility meter 156 itself is rotated approximately 45 degrees clockwise (see curved arrow 142) as allowed by the Gen/Safe plug in unit 200. To reconnect to the utility power lines 162, the utility meter 156 is then rotated back to the original utility position. An indicator of the presence of power in utility power lines 162 at any time is provided by LED pilot light 158 so that the owner may know when utility power is once again present and it is possible to switch back to that source.

If alternate power source 148 is present and the Gen/Safe unit 200 is switched to generator 140 power, the alternate power source 148 will once again also supply power when the generator 140 is started as the alternate power source 148 now assumes utility power 162 has been restored and is allowed to reconnect to what it perceives as restored utility power 162, but which is actually the generator 140 simulating utility input. This is a desirable situation as the generator 140 may run at a low output while the alternate power source 148 operates at a much higher power level thereby saving fuel in the generator 140 while still providing the maximum power output from the alternate source 148 to the load 160.

FIG. 3 shows an exploded view of the Gen/Safe unit 200 with construction features. The non-rotating switch deck 202 is connected to the existing utility meter base housing 204 by standard meter pins 206 and security collar seal 208. The rotating portion 210 of the Gen/Safe unit 200 allows for plug-in of the standard utility meter 212 with a second security collar 214. This allows the meter 212 itself to rotate as part of rotating portion 210. Rotating portion 210 and non-rotating switch deck 202 are held together and allowed to rotate by bolt 216 which also serves as a rotating neutral/ground when a generator (not shown) is plugged into Gen/Safe connection 218. Bolt 216 also allows connector pins 220 (three shown) to rotate across contacts 222 (two shown) in non-rotating switch deck 202 to perform the switching functions outlined in FIG. 5*a* and FIG. 5*b*. In order to provide proper high amperage connections, all contacts on rotating portion 210 (such as connector pins 220) are spring loaded 224 as shown. This allows for moving connections across the switch deck 202 and performance of various connection functions as shown in FIG. 5*a* and FIG. 5*b*. The non-rotating base deck 202 of the Gen/Safe unit 200 has large contacts 222 firmly attached to standard meter plug-in connections 206 on the other side of the base plate or non-rotating switch deck 202, which fit and are plugged into the existing utility meter base housing 204 in place of the original utility meter 212. The utility meter 212 is plugged into the Gen/Safe socket 226 on the rotating portion 210. FIG. 3 also shows the stationary connector cover 228 which is part of the non-rotating switch deck 202 and serves to cover the opening to the generator connector 218 when the rotating portion 210 is in the original utility position. This prevents plugging in the generator extension cord adapter (144 and 146 FIG. 2)) into the Gen/Safe unit A unless the utility power lines 162 (FIG. 2) are disconnected thereby removing any remote remaining possibility of a shock hazard to utility personnel. A small pilot indicator 230 is connected to the utility lines 162 (FIG. 2) to indicate when power is restored so the user may switch the unit back to utility power, i.e., the original utility position. Again, since there is no automatic restoration of power because of much lower cost manual operation of the device, this indicator is useful for the user.

In the event it is desired to connect an alternate energy power supply to the Gen/Safe unit 200, this may be accomplished by plugging the source into connector 232 which is installed on the non-rotating switch deck 202 where connections may be made to the connections going to the user load 160 (FIG. 2) connected to meter base 204 in that circuit. When the alternate system is in normal operation with utility power present, the utility meter will run backwards to credit the alternate energy produced. It is necessary to connect a short neutral wire from the generator socket to the user's building neutral and this is usually a difficult project using a split bolt connector (not shown) or other means of connection. The Gen/Safe round unit 200 provides this connection with a short, flexible neutral wire 234 ending in a novel "quick clip" 236 outlined in FIG. 7 and related discussion below.

FIGS. 4*a* and 4*b* show front and side views, respectively, of a second embodiment of the Gen/Safe rectangular unit 300 designed for higher power loads which the smaller contacts in the rotating round unit 200 (FIG. 3) are not able to handle. This Gen/Safe rectangular unit 300 also plugs into an existing meter base 302 and is held in place by fasteners 304 as well as a security collar 306 as it weighs more than the smaller Gen/Safe round unit 200 (FIG. 3). Internally, the Gen/Safe rectangular unit 300 consists of a standard meter socket 208 allowing the original utility meter 310 to be plugged in and retained by a second standard security collar 312. On either side of the standard meter socket 308 is a double pole, single throw switch mechanism (referenced collectively as 316, 318, 320, 322 and 324) operated by both sides of lower handle 314. This handle 314 (composed of insulating material) connects to metal rods 316 which in FIG. 4*a* connect upper and middle tubular metal cylinders 318 and 320 internally. Upper tubular metal cylinders 318 represent utility connections made through the meter plug-in on the rear of Gen/Safe rectangular unit 300. Middle tubular metal cylinders 320 represent connection to the user load (not shown in FIGS. 4*a* and 4*b*).

If the lower handle 314 is pulled down to position 322 (shown in dotted lines), the metal rods 316 are connected from middle tubular metal cylinders 320 to lower tubular metal cylinders 324 providing a connection between the user load (not shown) and the generator connector 326. Thus, the combination of these means provides the double pole single throw switching function outlined. When the handle 314 is in the upper position, the generator connector 326 is physically blocked by the handle 314 providing a second security measure to prevent any generator connection to the utility lines from being made by plugging in a generator plug. This feature is similar to the embodiment of FIG. 3 where a cover 228 (FIG. 3) prevents connection of a generator 140 (FIG. 2) unless the meter 212 is rotated as a second security measure to disconnect the utility lines 162 (FIG. 2) from the load 160 (FIG. 2). Electrical connections are shown in FIG. 6*b*. The generator neutral 328 is brought out of the Gen/Safe rectangular unit 300 in a manner similar to that in FIG. 3 and connected through clip 236 (see also, FIG. 7 and related discussion below) to the load neutral in the existing meter base 302.

FIGS. 5*a* and 5*b* outline the switching method used in the round unit 200 (FIG. 3) embodiment of Gen/Safe in the low-cost rotating contact scheme used. In FIG. 5*a*, lines 400 represent the utility connection, lines 402 represent the load connection, and lines 404 represent the generator connection. In order to represent the two sets of contacts used (one on the lower stationary plate and the second on the upper rotating plate which in the drawings are stacked on top of one another and difficult to show easily) lower contacts on the stationary base connected to the original utility meter base are represented by circles $\circ_1$-$\circ_4$, while the upper contacts representing those on the rotating set of contacts are represented by x marks, i.e., $x_1$-$x_6$. Rotating connection 406 correspond to the bolt 216 shown in FIG. 3. FIG. 5*a* also shows meter internal connections 414. The rotation of the upper deck 210 (FIG. 3) is limited by a slot 408 and stationary pin 410 which stops rotation of the upper deck 210 (FIG. 3) when contacts are aligned properly. Note that two additional contacts, $x_5$ and $x_6$, for the generator connection lines 404 are shown coming from generator connector 412 and ending in connections 416 on the rotating portion 210 (FIG. 3).

FIG. 5*b* shows the connections made when the connectors of FIG. 5*a* have been rotated clockwise as shown by arrow 418. Slot 408 has now been rotated so that pin 410 is now at the other end of travel and the utility lines 400 have now been disconnected from the meter (not shown) and the meter has been disconnected from the user load 402. The generator connections 404 have now been moved to the user load lines 402, thus providing generator power to the user load.

FIG. 6*a* is a schematic representation of the electrical connections for the round version of Gen/Safe 200 (FIG. 3). In FIG. 6*a* the complete electrical connections are shown. The switching between utility lines 420 and generator lines 424 is represented by switches 428 and 430 as they are moved from utility to generator positions in the Gen/Safe round unit 200. The connection of alternate energy power is also shown by lines 426, and the utility power indicator which shows connection to the utility lines when power is present is shown by 432. This indicator 432 shows 220 VAC power in the utility lines 420 when the indicator 432 is active.

FIG. 6*b* shows the switching action of the larger rectangular embodiment of Gen/Safe 300 (FIGS. 4*a-b*) for higher currents. The utility lines 440, user load 442, generator 444 and alternate power connection 446 are controlled by switches 448 as outlined in FIG. 4*a* (see 316, 318, 320 and 324) in two double pole, single throw switches 448 as previously outlined. Indicator 450 is also present as outlined in FIG. 6*a*.

FIG. 7*a* shows a new and unique quick connect clip 236 for rapid and safe connection to the neutral line 460 of the user's connection. This unique connection means allows the generator neutral 462 (or any other wire where a rapid high current permanent but removable connection is required) to be connected to maintain the desirable less-than-five-minute connection time to keep user costs low. To connect the clip 236 in FIG. 7*a* to the wire 460 in FIG. 7*b*, two disposable insulated wire levers 464 are connected into recesses 466 in the bottom of clip 468 which is made of highly conductive material such as spring copper, phosphor bronze or other material so that when pressed together as shown by arrows 470 the clip 468 is opened wide. (The insulated wire levers 464 may be much longer than shown in FIG. 7*a* to provide safe installation and also provide a long lever arm for considerable force to open the clip 468 fully.) When open and coated with any desired oxide inhibitor if needed, the clip 468 is slid over the bare neutral wire 460 and the levers 464 are relaxed and removed from the recesses 466 by pressing the sides of each insulated lever 464 together as shown by arrows 472. This leaves the clip 468 in FIG. 7*b* securely fastened in a three point connection with neutral conductor 460. The clip 468 can be removed if necessary by re-inserting the levers 464.

The invention claimed is:

1. An electrical power switch for mechanically switching between utility power and a generator, comprising:

a non-rotating switch deck configured for mounting to an existing electrical utility meter base housing having utility lines and load lines connectable to meter pins;

a rotating portion including a meter socket configured for receiving an electrical utility meter;

a bolt rotationally mounted between the non-rotating switch deck and the rotating portion configured for rotational switching engagement of rotating portion electrical contacts relative to the non-rotating switch deck electrical contacts between a utility position and a generator position;

a generator connector mounted within the rotating portion configured for receiving an adapter cord carrying generator lines connected to a generator;

a generator connector cover extending from the non-rotating switch deck configured to mechanically block adapter cord connection to the generator connector when the rotating portion is rotated into the utility position, thereby physically preventing connection of the adapter cord;

the utility position connecting the utility lines to the load lines; and the generator position connecting generator lines to the load lines.

2. The electrical power switch according to claim 1, further comprising a pilot indicator providing visual indication of presence or absence of utility power on the utility lines.

3. The electrical power switch according to claim 1, further configured for providing 120 and/or 240 volts AC power to the load lines.

4. The electrical power switch according to claim 1, further comprising a flexible neutral wire connected to a generator neutral contact at one end and configured with a quick-connect clip at an opposite end for quick connection to a load line neutral wire.

5. The electrical power switch according to claim 1, further comprising a rotating switch.

6. An electrical power switch for mechanically switching between utility power and a generator, comprising:

a meter socket on one side configured for receiving an electrical utility meter;

meter pins on an opposite side configured for connection to an existing meter base, the meter base having utility lines and load lines;

a generator connector for receiving generator lines through an adaptor cable connected to a generator;

a rotating switch mechanism for selectively switching between a utility position and generator position;

a generator connector cover configured to mechanically block connection to the generator connector when the rotating switch mechanism is rotated into the utility position, thereby physically preventing connection of the adapter cable;

the utility position connecting the utility lines to the load lines; and the generator position connecting generator lines to the load lines.

7. The electrical power switch according to claim 6, further comprising a pilot indicator providing visual indication of presence or absence of utility power on the utility lines.

8. The electrical power switch according to claim 6, further configured for providing 120 and/or 240 volts AC power to the load lines.

9. The electrical power switch according to claim 6, further comprising a flexible neutral wire connected to a generator neutral contact at one end and configured with a quick-connect clip at an opposite end for quick connection to a load line neutral wire.

10. The electrical power switch according to claim 9, wherein the quick-connect clip further comprises:

a clip electrically connectable to the neutral load line, the clip comprising two opposing jaws, each jaw comprising two recesses, the clip formed of a highly conductive material selected from the group consisting of: spring copper and phosphor bronze; and two disposable insulated wire levers each configured for quick connection to, and removal from, one of the two opposing jaws via each of the two associated recesses.

* * * * *